United States Patent [19]

Jürgens

[11] Patent Number: 4,559,854

[45] Date of Patent: Dec. 24, 1985

[54] CUTTING APPARATUS FOR STOCK IN THE FORM OF BARS

[75] Inventor: Heinz Jürgens, Unna, Fed. Rep. of Germany

[73] Assignee: Brown, Boveri & Cie Aktiengesellschaft, Mannheim, Fed. Rep. of Germany

[21] Appl. No.: 637,859

[22] Filed: Aug. 6, 1984

[51] Int. Cl.[4] .............................................. B23D 33/02
[52] U.S. Cl. .......................................... 83/170; 83/15; 83/365; 83/370
[58] Field of Search .................... 83/170, 15, 365, 370, 83/360

[56] References Cited

U.S. PATENT DOCUMENTS

| | | | |
|---|---|---|---|
| 3,422,711 | 1/1969 | Toney et al. | 83/170 X |
| 4,343,209 | 8/1982 | Moelbert | 83/170 X |
| 4,385,538 | 5/1983 | Bieri et al. | 83/170 X |

Primary Examiner—Donald R. Schran
Attorney, Agent, or Firm—Herbert L. Lerner; Laurence A. Greenberg

[57] ABSTRACT

A cutting apparatus for heated stock in the form of metallic bars of finite length, includes a transport device for moving the bars back and forth in longitudinal direction of the bars along a transport path, a heating device upstream of the transport device along the transport path, a cutting device downstream of the transport device along the transport path for cutting the bars to a given bar section length at a cutting position, a stop downstream of the cutting device along the transport path for limiting movement of the bars, a clamping device disposed between the cutting device and the stop along the transport path for holding bars of at least a given minimum remnant length in the cutting position, a device in vicinity of the cutting device for carrying away cut bar sections and end remnants of bars out of the cutting position, a repulsion device in vicinity of the cutting device for moving the bar remnants into the heating device after cutting, a sensor disposed along the transport path for sensing presence and absence of the bars, the sensor having a sensing region disposed at a spacing substantially equal to twice the given bar section length plus the minimum remnant length upstream of the stop, and a control device connected to the sensor for delivering control signals for the further treatment of the bar remnants as a function of the absence and presence of a portion of a bar section in the sensing region of the sensor.

7 Claims, 4 Drawing Figures

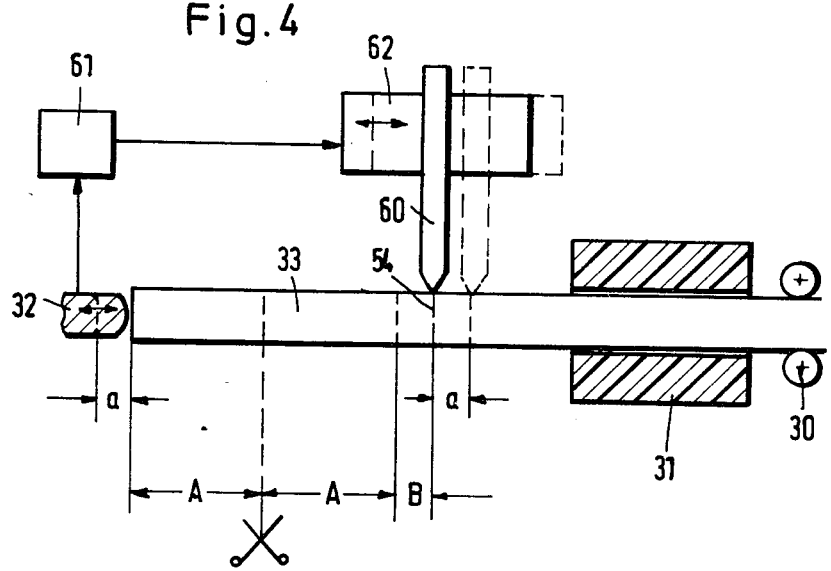

CUTTING APPARATUS FOR STOCK IN THE FORM OF BARS

The invention relates to a cutting apparatus for heated stock in the form of bars of finite length formed of a metallic material, including a transport device upstream of the cutting apparatus for transporting the bars backwards and forwards in the longitudinal direction of the bars, a stop downstream of the cutting apparatus in the longitudinal direction of the bars for limiting the transport movement of the bars, a clamping device for maintaining the bars in their cutting position, a device for carrying away the cut bar sections or end remnants out of the cutting position, and a repulsion device for moving back or repelling bar remnants into a heating device after cutting.

Cutting apparatus of this type as used particularly for cutting to size hot stock in the form of bars, for further processing in a forging apparatus. In order to prevent interruptions of the production cycle, it is necessary for the cut bar sections to always conform to a precise desired length, which can be prescribed by the position of the stock.

When an end remnant or remaining piece of the bar-shaped stock is transported into vicinity of the cutting apparatus, it must be segregated out of the production cycle. An end remnant exists when it can no longer be reliably cut, that is to say, when its length is shorter than the length of a bar section plus a clamping length required for the cutting operation.

In order to detect and segregate bar remnants that are unsuitable for cutting, it has been proposed in German Published, Prosecuted Application No. 26 31 989 to place a gripping device for the bar material downstream of the cutting apparatus in the transport direction of the bars. The gripping device for the bar material exerts a tractive or compressive force upon the bar material before cutting. If an end remnant is present, then the gripping device transports the end remnant out of the cutting position and delivers a signal for the segregation of the end remnant. However, if the bar remnant can be cut further, then it is maintained in the cutting position by a workholder or workpiece holder.

However, this cutting apparatus with its gripping device is not suitable for cutting long bar sections. When cutting long bar sections, the cycle time is so long because of the necessary time outlay for forging, that after a bar section has been cut off, it is necessary for the bar remnant to be transported back into the heating installation in order to avoid excessive cooling of the bar remnant. However, no such backward transport is provided in the case of the apparatus according to German Application No. 26 31 989. An installation for cutting long bar sections is described in the article "Induktionserwärmungs- und Warmschneideanlage für Schmiederohlinge" (Induction Heating and Hot Cutting Installation for Rough Stampings) in the ASEA Journal 1982, 27th year, pages 15 to 20. This installation provides a backwards transport of the bar remnant. The remnant detection occurs through the use of a positioning system with a length measurement on the bars in the region before the heating. However, this device is highly complicated and necessitates additional efforts in the region of the bar magazine. It is also necessary for the position of the bars in the installation to be traced by means of memories, which results in high requirements for control equipment.

It is accordingly an object of the invention to provide a cutting apparatus for stock in the form of bars, which overcomes the hereinafore-mentioned disadvantages of the heretofore-known devices of this general type, and in which during the cutting of a bar section, a detection is made as to whether or not the bar remnant exhibits a sufficient length to permit it to be cut again. It is also an object to provide an economical device for cutting long bar sections, which permits the bar remnants to be transported back into the heating device.

With the foregoing and other objects in view there is provided, in accordance with the invention, a cutting apparatus for heated stock in the form of metallic bars of finite length, comprising a transport device for moving the bars back and forth in longitudinal direction of the bars along a transport path, a heating device upstream of the transport device along the transport path, a cutting device downstream of the transport device along the transport path for cutting the bars to a given bar section length at a cutting position, a stop downstream of the cutting device along the transport path for limiting movement of the bars, a clamping device disposed between the cutting device and the stop along the transport path for holding bars of at least a given minimum remnant length required for cutting the bars in the cutting position, means in vicinity of the cutting device for carrying away cut bar sections and end remnants of bars out of the cutting position, a repulsion device in vicinity of the cutting device for moving back the bar remnants into the heating device after cutting, a sensor disposed along the transport path for sensing presence and absence of the bars, the sensor having a sensing region disposed at a spacing substantially equal to twice the given bar section length plus the minimum remnant length upstream of the stop, and a control device connected to the sensor for delivering control signals for the further treatment of the bar remnants as a function of the absence and presence of a portion of a bar section in the sensing region of the sensor.

This apparatus only requires small mechanical efforts, as compared to conventional apparatus, and is therefore insensitive to wear. It avoids any contact with or damage to the bars and permits reliable operation while maintaining close tolerances. The apparatus is particularly suitable for operation with long cycle times, for which the bars would otherwise cool too greatly without repulsion into the heating region.

In accordance with another feature of the invention, the sensor is: a light barrier having a light source, such as a laser, and a photoelectric receiver; an infra-red light barrier; a reflected light sensor; or a pneumatic device.

The reflected light sensor may be a sensor system which focuses infra-red impulses emitted by a transmitter diode through a lens onto the sensing region and receives the radiation reflected by a bar through a photo-receiver. If a partial bar section is not present in the sensing region, then reflected radiation will not be registered by the photo-receiver. The pneumatic device may be a gas nozzle which is directed toward the bar in the sensing region. The gas discharge quantity or gas pressure in the nozzle indicates whether or not a partial bar section is present in the sensing region.

In accordance with a further feature of the invention, the control device evaluates the operating time of the sensor in combination with the speed of upstream motion of the bars, and determines the length of the end remnants. If a time element is employed in the control device, the time element can distinguish between short and long remnants. This is advantageous because it may be convenient to repel longer remnants into the heating installation, although they can no longer be cut, and to segregate short remnants in all cases. The control device with the time element can effect an appropriate manipulation of the remnants.

When an end remnant is present, the control device delivers a control signal to the manipulator (the apparatus for carrying away the cut bars) to segregate the end remnant out of the transport device. The control device also influences the repulsion device so that if a bar remnant is present which can be cut further, it is repelled into the heating device. The control device may furthermore influence the bar transport so that the bar transport device performs a backward transport of the bar remnant into the heating installation.

In accordance with a concomitant feature of the invention, the stop and the sensing region are displaceable along the transport path and the device includes means connected to the stop and the sensors for coupling displacement of the stop and sensing region, causing the stop and sensing region to be displaced by substantially the same amount in opposite directions.

The coupling of the stop position with the sensor position may be effected by mechanical means or by an electric motor, for example. Other features which are considered as characteristics for the invention are set forth in the appended claims.

Although the invention is illustrated and described herein as embodied in a cutting apparatus for stock in the form of bars, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 is another partly cross-sectional side-elevational view, including a functional diagram of a position adjusting device for the sensor.

Figure 1:
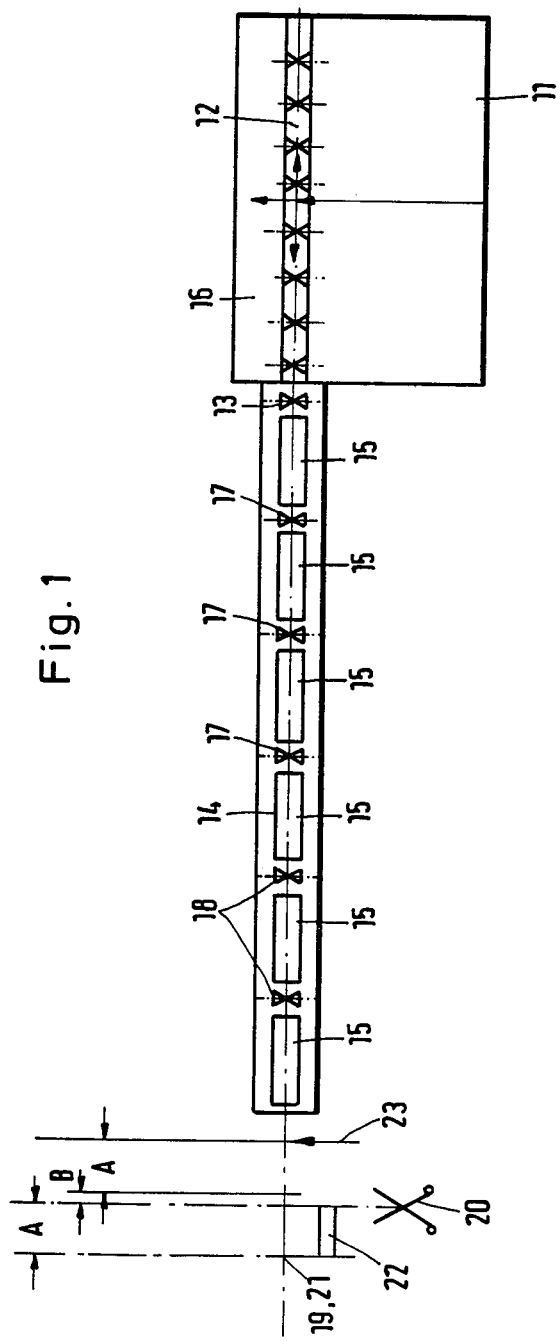
FIG. 1 is a diagrammatic illustration of an induction heating installation with a hot cutting apparatus for rough stampings according to the invention.

Referring now to the figures of the drawings in detail, and first particularly to FIG. 1 thereof, there is seen a magazine 11 from which non-illustrated bars are withdrawn and placed in an entry roller bed 12. The bars are engaged by a drive unit 13 with a continuous feed and are transported at uniform speed through a heating device 14. The heating device 14 includes a plurality of induction coils 15. The coils 15 are optionally equipped with individual electrical power supply and power regulation, through which an optimum heating pattern can be achieved.

Before the bars are pushed into the drive unit 13, the straightness of the bars is checked. Excessively curved bars are sorted out automatically and deposited in a reject magazine 16. The bars normally travel in mutual contact across transport rollers 17 through the heating device 14, that is to say with no spacing. Following the transport rollers 17, the bars reach drive units or transport devices 18 which are equipped with rapid return motion and overload coupling for the forward and backward transport of the bars.

When a bar has reached the end of the heating device 14, it is moved with increased speed by the drive units 18 against a stop 19 and retained by a workholder. The drive units 18 are now driven in the reverse direction of rotation and exert a tractive force upon the bar located in the region of influence of the drive units for the backward transport into the heating device 14. The backward transport of the bar is impossible if the bar located in the region of influence of the drive units 18 is so long that it extends to the stop 19 by itself. In this case, the overload couplings of the drive unit 18 become operative.

However, if two bars mutually abut in the region between the stop 19 and the drive unit 18, then the second bar is moved backward by the drive units 18 into the heating device 14, whereas the first bar which is in contact with the stop 19 is retained by the workholder. This results in a gap being produced between the bars, which is detected by a sensor when a remaining portion or remnant end of the bar is present.

After cutting, the bar remnant is repelled into the heating device 14 by a repulsion device 21, which is pivotable onto the stop axis, so that it does not cool. The cut bar section 22 is fed by a manipulator to a non-illustrated forging device. A sensor for sensing the bars, indicated by an arrow 23, is disposed at an interval in front of the stop 19, which is equal to twice the length A of a cut bar section plus a minimum remnant or short length B required for cutting the bars. The sensor is capable of detecting whether or not a partial bar section is located in its sensing region. The sensor is followed by a control device which is not shown in FIG. 1. The control device delivers control signals for the further treatment of the bar remnant as a function of the presence or absence of a partial bar section in the sensing region.

Figure 2:
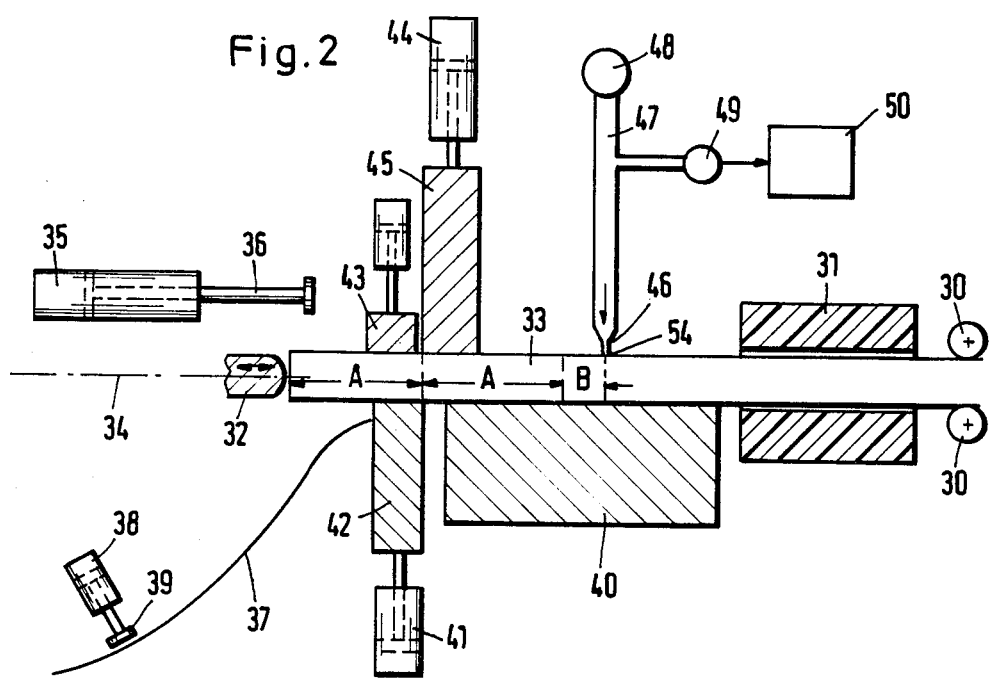
FIGS. 2 and 3 are respective partly cross-sectioal, side-elevational and top-plan views of a cutting apparatus according to the invention.
Figure 3:
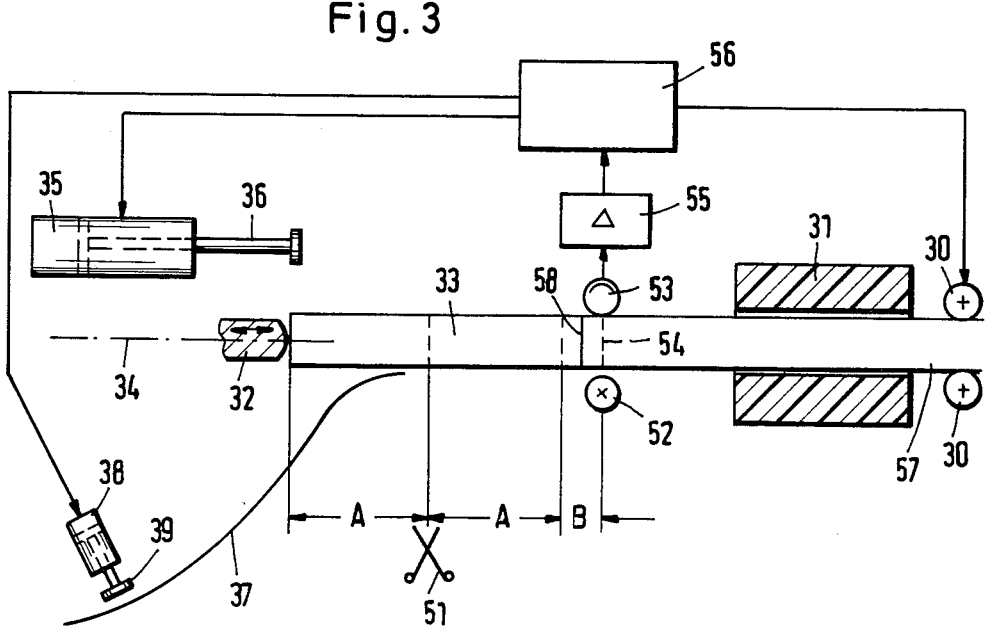

Only the vicinity of the cutting apparatus is illustrated in FIGS. 2 and 3; FIG. 2 showing a side elevation and FIG. 3 showing a plan view of the cutting apparatus. However, the cutting blades have only been indicated symbolically in FIG. 3. FIGS. 2 and 3 also differ in the choice of the sensor. FIG. 2 shows a pneumatic device used as a sensor, whereas in FIG. 3 the sensor is in the form of a light barrier.

Both FIG. 2 and FIG. 3 show a drive unit 30, a coil 31, a bar 33 moved against a longitudinal stop 32, a repulsion device 36 pivotable onto a stop axis 34 and operable by a hydraulic cylinder 35, a reject chute 37 (through which bar remnants which are too short, too hot and too cold are removed), and a shunter or point adjuster 39 operable by a hydraulic cylinder 38. The cylinder is shown in a position rotated through 90°.

FIG. 2 additionally shows a support table 40 upon which the bar 33 slides, a lower blade 42 operable by a hydraulic cylinder 41, a workholder 43 operable by a hydraulic cylinder, and an upper blade 45 operable by a hydraulic cylinder 44. A nozzle 46 is directed at the bar 33 at an interval (calculated from the stop 32) equal to twice the section length A plus the minimum remnant length B (clamping length) necessary for cutting the bars. The nozzle 46 defines the end of a pipe 47 subjected to negative or suction gas pressure. The pressure in the pipe 47 is generated by a pressure generator 48. A pressure gauge 49 measures the gas pressure in the pipe 47, and delivers a signal which is evaluated by a control device 50. If the partial section of a bar 33 is present in front of the nozzle 46, then the pressure in the pipe 47 is higher than when there is an absence of a bar 33 in a nozzle region 54. In this manner, the control device 50 determines whether or not a bar 33 is present in vicinity of the nozzle 46.

The cutter 51 is only symbolically represented in FIG. 3. A light barrier including a light source 52 and a radiation receiver 53 is disposed at an interval of twice the section length A plus the minimum remnant length B necessary for cutting the bars, in front of the stop 32. If the partial section of a bar is present in the sensing region 54 of the light barrier, then the light beam is interrupted between the radiation source 52 and radiation or photoelectric receiver 53. The signal of the radiation receiver 53 is amplified by an amplifier 55 and is transmitted to a control device 56. The sensor may be a laser, infra-red or reflected light sensor. The control device 56 delivers control signals to the cylinder 35 of the repulsion device 36 (and also to the pivoting mechanism of the repulsion device 36 to pivot it into the stop axis 34, although in a non-illustrated manner) and to the cylinder 38 of the shunter 39, depending upon whether or not a cuttable bar remnant is present in front of the plane of the cutter 51 at the time of cutting the bar 33.

In the illustrated embodiment according to FIG. 3, a first bar 33 and a second bar 57 immediately adjacent the first bar 33, are present in the transport path of the bars. The two bars 33, 57 are in mutual contact at a point 58. As is clear, only one more bar section (bar section length A) can be obtained from the first bar 33. The remnant piece, although it is still longer than a bar section length A, is too short to be cut again, because the remnant remaining after deducting a bar section length A is shorter than the required clamping length B and it is therefore no longer posssible to clamp the end remnant securely.

The criteria according to which the control devices 50, 56 detect end remnants and deliver control signals for the further treatment of the bar remnants, will be explained below with reference to a functional cycle:

A bar 33 is moved against the stop 32 by the drive units 30 and is maintained by the workholder 43 of the cutter. The drive units are then reversed and pull a bar, forming a gap between the first bar 33 is contact with the stop 32 and a second bar which is present in vicinity of the influence of the drive units 30. If the sensor 46; 52, 53 registers the gap, this means that the bar in contact with the stop is shorter than twice the bar section length A (block length) plus a minimum remnant or remaining piece length B (clamping length). Simultaneously with the retraction of the second bar 57, a bar section of length A is cut off from the bar in contact with the stop 32 by the cutter 42, 45; 51, and is transported out of vicinity of the cutter to the shaping machine (such as a forging press), by a non-illustrated manipulator. The repulsion repulsion device 36 then pivots into the stop axis 34 and repels the bar remnant back into the heating device 14. If the bar 33 is deflected so far that the sensor 46; 52, 53 registers a gap upon retraction of the second bar 57 (by releasing a signal), then this means that the bar remnant is a residual piece which cannot be cut again after cutting the bar 33, because it does not exhibit an adequate length for gripping by the workholder 43. A time element which measures the time between the start of the backward travel and the release signal of the sensor 46; 52, 53 is integrated in each of the control units 50, 56. If this tme remains below an experimentally or theoretically determinable value, then the end remnant is a "long" end remnant. However, if the time exceeds a prescribed value, then a "short" end remnant is present. In the case of a "long" end remnant, the control device 50, 56 delivers a control signal to the repulsion device 36, which pushes the end remnant back into the heating device 14. Only in the subsequent cycle, is the end remnant sorted out and slid down the reject chute 37. However, if a "short" end remnant is present, then the control device 50, 56 delivers a control signal for the immediate segregation of the end remnant to a non-illustrated device.

FIG. 4 illustrates a device wherein the position of a sensor 60 along the transport path of the bars is coupled with the position of the length or elongated stop 32, so that the longitudinal stop 32 and the sensing region 54 of the sensor 60 can be displaced by an equal amount, but in opposite directions in the longitudinal direction of the bar. For this purpose, the position of the stop 32 is determined by a position pick-up 61. The position pick-up 61 delivers a corresponding control signal to a carriage 62 slidable along the transport path of the bars. The sensor 60 is mounted on the carriage 62. The control mechanism is constructed in such a way that a positional displacement of the stop 32 by an amount a to the left produces a positional displacement of the sensor, by an equivalent amount a, but to the right.

The foregoing is a description corresponding in substance to German Application No. P 33 28 304.4, filed Aug. 5, 1983, the International priority of which is being claimed for the instant application, and which is hereby made part of this application. Any material discrepancies between the foregoing specification and the aforementioned correspondng German application are to be resolved in favor of the latter.

I claim:

1. Cutting apparatus for heated stock in the form of metallic bars of finite length, comprising a transport device for moving the bars back and forth in longitudinal direction of the bars along a transport path, a heating device upstream of said transport device along said transport path, a cutting device downstream of said transport device along said transport path for cutting the bars to a given bar section length at a cutting position, a stop downstream of said cutting device along said transport path for limiting movement of the bars, a clamping device disposed between said cutting device and said stop along said transport path for holding bars of at least a given minimum remnant length in said cutting position, means in vicinity of said cutting device for carrying away cut bar sections and end remnants of bars out of said cutting position, a repulsion device in vicinity of said cutting device for moving the bar remnants into said heating device after cutting, a sensor disposed along said transport path for sensing presence and absence of the bars, said sensor having a sensing region disposed at a spacing substantially equal to twice said given bar section length plus said minimum remnant length upstream of said stop, and a control device connected to said sensor for delivering control signals for the further treatment of the bar remnants as a function of the absence and presence of a portion of a bar section in said sensing region of said sensor.

2. Cutting apparatus according to claim 1, wherein said sensor is a light barrier having a light source and a photoelectric receiver.

3. Cutting apparatus according to claim 2, wherein said sensor is an infra-red light barrier.

4. Cutting apparatus according to claim 1, wherein said sensor is a reflected light sensor.

5. Cutting apparatus according to claim 1, wherein said sensor is a pneumatic device.

6. Cutting apparatus according to claim 1, wherein said control device evaluates the operating time of said sensor in combination with the speed of upstream motion of the bars, and determines the length of the end remnants.

7. Cutting apparatus according to claim 1, wherein said stop and said sensing region are displaceable along said transport path, and including means connected to said stop and said sensor for coupling displacement of said stop and sensing region, causing said stop and sensing region to be displaced by substantially the same amount in opposite directions.

* * * * *